Nov. 4, 1958
C. I. STONEROCK ET AL
2,859,050
TRACTOR TOWING HITCH
Filed Jan. 12, 1956
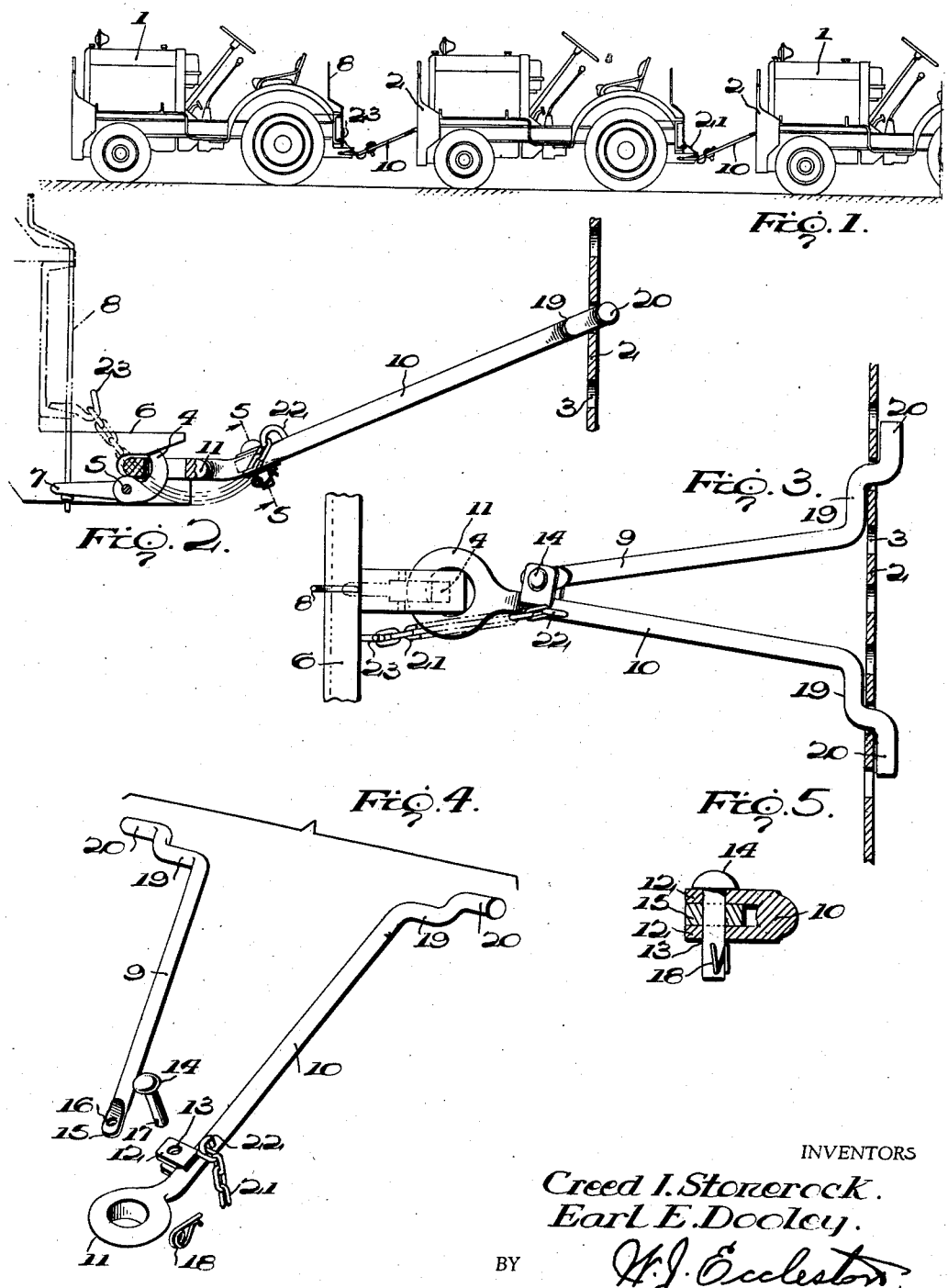
INVENTORS
Creed I. Stonerock.
Earl E. Dooley.
BY
*H. J. Eccleston*
ATTORNEY United States Patent Office 2,859,050
Patented Nov. 4, 1958

2,859,050

TRACTOR TOWING HITCH

Creed I. Stonerock, Circleville, and Earl E. Dooley, Columbus, Ohio

Application January 12, 1956, Serial No. 558,814

3 Claims. (Cl. 280—491)

(Granted under Title 35, U. S. Code (1952), sec. 266)

The invention described herein, if patented, may be manufactured and used by or for the Government for governmental purposes, without the payment to us of any royalty thereon.

This invention relates to a hitch for warehouse tractors and the like of the type in which a perforated pusher or bumper plate is vertically mounted on the front of the tractor for use in pushing a stack of pallets or other articles or material from one point to another.

Heretofore it has been impossible to hitch two or more of these tractors together to form a train because the pusher plate interfered with the engagement of conventional hitches with the front end of the tractor.

It is an object of the present invention therefore to provide a hitch which may be directly connected to the bumper plate for the purpose of uniting two or more of the tractors so that a plurality of them may be moved from one point of operation to another as a train without the need of a separate operator for each vehicle.

Other objects and advantages of the invention will be apparent from the following description when taken in connection with the accompanying drawings in which, Figure 1 is a side elevational view of a train of warehouse tractors of the type with which the present invention is concerned.

Figure 2 is a side elevational view of the novel hitch, parts of the related mechanism being shown in section.

Figure 3 is a fragmentary plan view of the hitch, certain of the related parts being shown in section.

Figure 4 is an exploded perspective view of the several elements of the hitch per se, and Figure 5 is a vertical sectional view taken on the line 5—5 of Figure 2.

Referring to the drawings more specifically and by reference numerals, the numeral 1 indicates a conventional warehouse tractor of the type with which the present invention is concerned, namely, one in which a pusher plate, such as indicated by the numeral 2, is mounted on the forward end of the tractor for the purpose of pushing stacks of pallets or other articles or goods along the floor of the warehouse or other surface on which the tractor may be operating. This pusher plate 2, as is customary, is provided with a plurality of spaced apertures 3 for the purpose of permitting the passage of air to the radiator of the internal combustion engine which forms the motive power of the tractor.

The rear end of warehouse tractor of this general type is provided with a coupling member for the purpose of connecting a plurality of trailers or for connecting and forming a train of tractors where no pusher plate is present to interfere with the coupling. In the present instance this coupling member consists of a hook 4 mounted on a horizontal pivot 5 (Figure 2) installed on the framework 6 of the tractor. This hook is provided, in the present instance, with a forward extension 7 associated with a vertically slidable operating rod 8 within reach of the driver of the tractor so that the hook may be moved to inoperative position while the driver remains seated on the tractor.

In order that warehouse tractors provided with pusher plates 2 may be connected to form a train so that a plurality of them may be moved from one place to another without requiring each tractor to be individually driven, we have provided the present novel hitch which consists primarily of two rods or bars 9 and 10. The rod 10 is provided with an eye 11 adapted to engage over the coupling hook 4 of the forward tractor when the hook is lowered. This rod 10 has formed thereon, or otherwise connected therewith, a pair of vertically spaced plates 12 provided with registering apertures 13 adapted to receive a locking pin 14, and the forward end of the rod 9 is provided with a flattened portion 15 adapted to be received between the plates 12, and an aperture 16 through which the locking pin 14 may be passed when pivotally connecting the two rods 9 and 10. The lower end of the locking pin is apertured as indicated by the numeral 17 for the reception of a cotter pin or the like 18 for securing the pin against inadvertent removal from its position in which the bars 9 and 10 are pivotally connected.

In order to secure the free or rear ends of the rods 9 and 10 of the hitch to the pusher plate 2 of the trailing vehicle so that they may not become inadvertently disconnected therefrom, such ends are provided with laterally extending arms 19 and the rear ends of these arms are provided with offset hooks or bills 20, as clearly indicated in Figures 3 and 4.

In order to prevent inadvertent disconnection of any of the tractors in the train, in the event the coupling should fail, safety chains 21 have been provided, one end of which may be connected to a staple 22 mounted on the rod 10 and the other end of which may be connected to a hook 23 permanently fixed to the rear end of each of the tractors.

In installing the present hitch on this particular type of tractor the rods 9 and 10 are disconnected as shown in Figure 4 and are individually manipulated so as to insert the offset hooks or bills 20 into horizontally spaced apertures 3 in the pusher plate 2. Thereafter the forward ends of the rods 9 and 10 are swung toward each other as indicated in Figure 3 so as to bring the laterally extending arms 19 into parallel relationship with the pusher plate 2 and the flattened portion of the rod 15 into position between the vertically spaced plates 12 of the rod 10. After the flattened portion 15 has been brought into position the pin 14 is passed downwardly through the apertures 13 and 16 and the cotter pin 18 is then installed through the transverse aperture 17 in the pin 14 so as to secure the several parts against inadvertent separation. When the rods 9 and 10 are so interlocked and secured in this position, it will be apparent that the offset hooks 20 are so interlocked with the pusher plate 2 that they cannot be disconnected therefrom, and the laterally extending arms 19 are in parallel relationship to the plate 2 so that the hitch may be used not only in drawing a train of the warehouse trailers forwardly but may also be used in backing them if desired.

From the foregoing description taken in connection with the accompanying drawings it will be apparent to those skilled in the art that we have devised a novel type of tractor hitch which is of simple and inexpensive construction for tractors provided with perforated pusher plates on their forward ends, that the hitch consists mainly of the two elements 9 and 10, that these elements when disconnected from each other may be readily connected to the pusher plate without the need of tools of any sort, that the connection is such as to prevent uncoupling when the rods are secured together at their forward ends by the locking pin 14, that the hitch is so constructed as to allow for a backing movement when necessary and that separation of the several units of the train should the coupling 4 become disarranged or broken is prevented by reason of the safety chain which may be connected to the hitch and to the forward tractor of the train.

In accordance with the patent statutes we have described what we now consider to be the preferred form of construction, but since various minor changes may be made in structural details without in any way departing from the spirit of the invention, it is intended that all such changes be included within the scope of the appended claims.

We claim:

1. A hitch for a tractor provided with a perforated pusher plate on its front end, comprising a pair of separable rods, a laterally extending arm on the rear end of each rod, an extension on each arm, said extension paralleling the arm, and connected thereto by a right angular portion having a length at least as great as the thickness of the pusher plate, said extension adapted to be passed through perforations in the pusher plate and to engage the rear face thereof when the rods are united, means for uniting said rods after their extensions are engaged in the plate, and means on one of said rods for engaging a conventional coupling on the rear end of another tractor.

2. A hitch for a tractor provided with a perforated pusher plate on its front end, comprising a pair of separable rods, a laterally extending arm on the rear end of each rod, an extension on each arm, said extension paralleling the arm, and connected thereto by a right angular portion having a length at least as great as the thickness of the pusher plate, said extensions adapted to be passed through perforations in the pusher plate and to engage the rear face thereof when the rods are united, means for uniting said rods after their extensions are engaged in the plate, said means comprising registering eyes on the rods and a pin for entering said eyes, and means on one of said rods for engaging a conventional coupling on the rear end of another tractor.

3. A hitch for a tractor provided with a perforated pusher plate on its front end, comprising a pair of separate rods, a laterally extending arm on the rear end of each rod, an extension on each arm, said extension paralleling the arm, and connected thereto by a right angular portion having a length at least as great the the thickness of the pusher plate, said extensions adapted to be passed through perforations in the pusher plate and to engage the rear face thereof when the rods are united, means for uniting said rods after their extensions are engaged in the plate, said means comprising registering eyes on the rods and a pin for entering said eyes, means on one of said rods for engaging a conventional coupling on the rear end of another tractor, and a safety chain attached to one of said rods and adapted to be connected to the rear end of said other tractor.

References Cited in the file of this patent

UNITED STATES PATENTS

| Number | Name | Date |
|---|---|---|
| 1,381,761 | Stansbury et al. | June 14, 1921 |
| 1,383,470 | Lind | July 5, 1921 |
| 1,779,192 | Signer | Oct. 21, 1930 |
| 2,139,970 | Moore | Dec. 13, 1938 |
| 2,196,115 | Jacobson | Apr. 2, 1940 |
| 2,274,767 | Zink et al. | Mar. 3, 1942 |
| 2,322,576 | Huebshman et al. | June 22, 1943 |
| 2,410,280 | Fergason | Oct. 29, 1946 |
| 2,601,992 | Dillon | July 1, 1952 |